3,503,624
SULKY

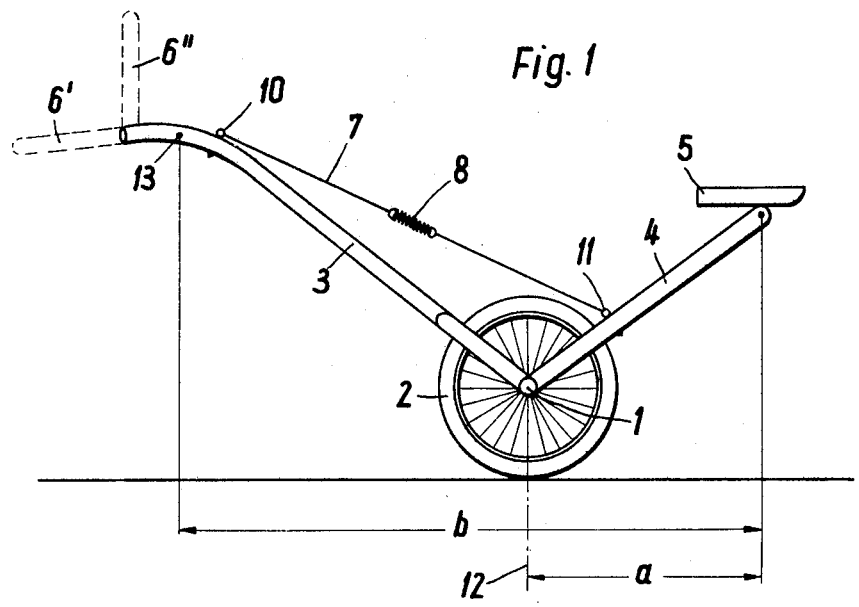
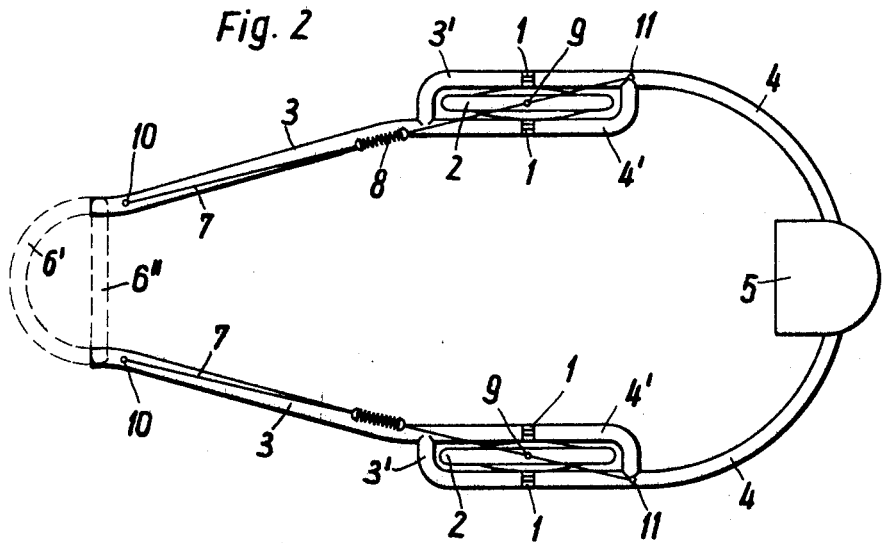

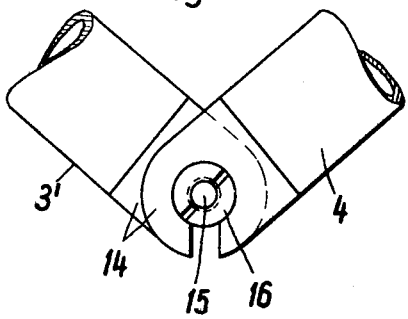
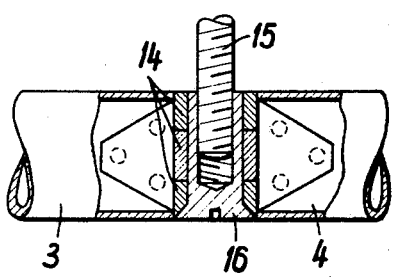
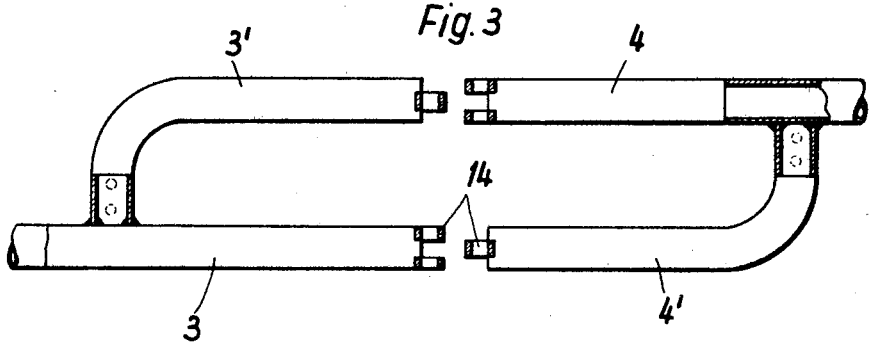
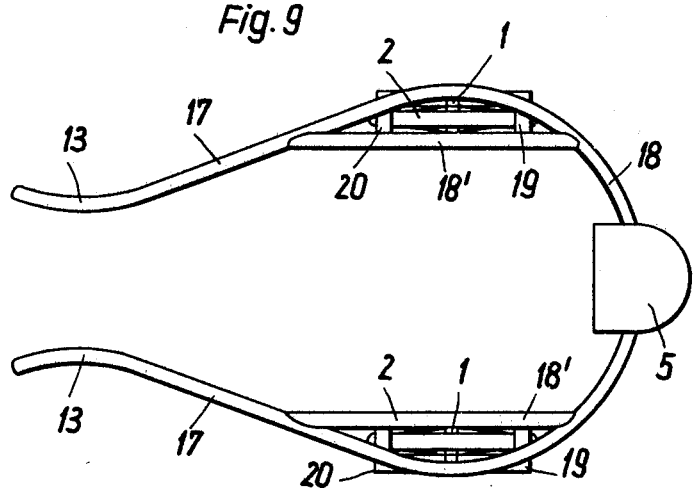

Walter Weber, 25/II Clemensstrasse, Munich, Germany, and Herbert Templin, Heiligendorf, near Wolfsburg, Germany
Filed May 19, 1967, Ser. No. 639,894
Claims priority, application Germany, May 26, 1966, W 41,670
Int. Cl. B62d *61/00;* B62c *1/08*
U.S. Cl. 280—64                                      7 Claims

ABSTRACT OF THE DISCLOSURE

A sulky normally does not provide for variations in weight between different riders, and this is achieved in the invention by using struts between the frame and the axles which are pivotably adjustable so as to vary the angle between them.

Figure 6:
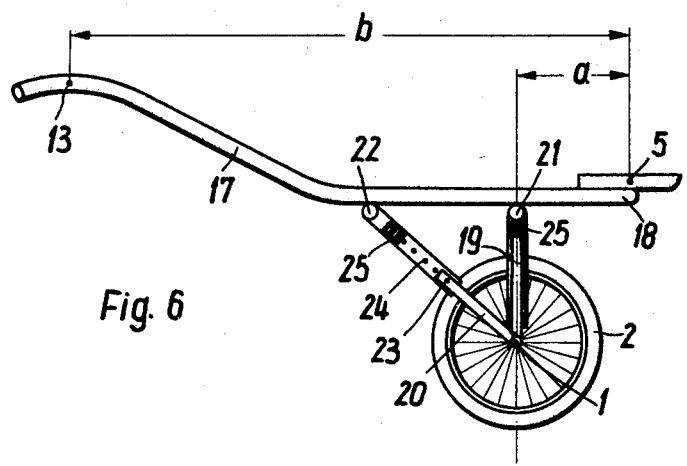

A modification of the invention provides for a single strut between the frame and each axle, the said strut being pivotable and held in position by bracing members.

Shock-absorbing means are also provided.

---

This invention relates to a sulky of the type in which the driver's seat is located to the rear of the vertical plane through the wheel axles, and the wheel axle bearings are connected to the drawing shafts by at least one pair of struts.

In such sulkies the horse's hindquarters are located in the proximity of the vertical plane through the wheel axles, the object of the arrangement being to relieve the horse's back of the weights of the carriage and driver, and there should be a tendency for the horse to be lifted so that it can trot as easily and smoothly as possible. In practice the weight is not in fact relieved to the desired extent by the counterweight of the driver. Adjustment of the position of the driver's seat which some types of sulky permit, is not sufficient for a fine adjustment to be effected of the distance between the point of attachment of the shafts to the harness of the horse and the driver's sea, and between the driver's seat and the vertical plane through the wheel axles, as is necessary for relieving weight from the horse. Another disadvantage of conventional sulkies is that jolts affecting the carriage are transmitted through the traces to the horse's breast strap and thus trouble and hinder it, inducing the horse to gallop.

When not in use sulkies occupy a good deal of space, which is a nuisance particularly from the point of view of convenient transportation from one race course to another.

It is the object of the present invention to avoid such disadvantages, and sulkies constructed according to the invention enable the weight on the horse to be relieved as required, taking into account the weight of any particular driver occupying the seat of the sulky, and which can be run with the maximum comfort to the horse. Moreover, sulkies according to the invention are capable of being easily dismantled and reassembled.

The invention consists of a sulky having a frame consisting of drawing shafts and a rearwardly arched member carrying a driver's seat situated to the rear of a vertical plane through the wheel axles, each of which wheel axles is connected to the frame by at least two struts inclined at an angle to each other, the improvement being that the said struts are pivotably connected so that the angle between them is adjustable.

In one embodiment both of two struts are mounted on the particular axle by a lug at the axle end of each strut, and in another embodiment only one strut engages the particular axle, a second strut being pivotably mounted on the said first strut.

One of the struts mounted on a particular axle may form the conventional integral rearward arched member which carries the driver's seat, the other of the said struts forming one of the drawing struts. The struts may each be held in the desired position relative to each other by an adjustable bracing member which may be resilient. Alternatively at least one of the struts may be an adjustable telescopic strut.

In a modification of the arrangement according to the invention hereinbefore described, each of only one pair of struts engages the particular axles of the wheels, each strut of the said one pair being held in its desired position by a pair of oppositely placed bracing members, e.g. wires which may be resilient.

The arrangement according to the invention readily permits the distances between the point of attachment of the shafts to the harness and the driver's seat, and between the driver's seat and the vertical plane through the wheel axles, to be adjusted. Such adjustment may be facilitated by forming the shafts and/or a rearward arched member from the struts so as to be adjustable in length, for instance by the use of telescopic struts. The bracing members impart resilience to the carriage frame and thus suppresses the transmission of jolts to the horse.

In the case of a sulky comprising shafts and a rearward arched member of integral construction in a manner known in the art, the struts according to the invention may be pivotably attached to the shafts and they may be of adjustable length, for instance by a telescopic form of construction. By varying the ratio of the respective lengths of the struts the position of the wheel axles in relation to the point of attachment of the shafts to the harness and the position of the driver's seat can be adjusted as may be desired.

It has been found that the horse is relieved of weight in a desirable manner if the horizontal distance between the vertical on the wheel axles and the driver's seat is between $\frac{1}{7}$ and $\frac{5}{7}$ the horizontal distance between the point of attachment of the shafts to the harness and the driver's seat.

Figure 7:
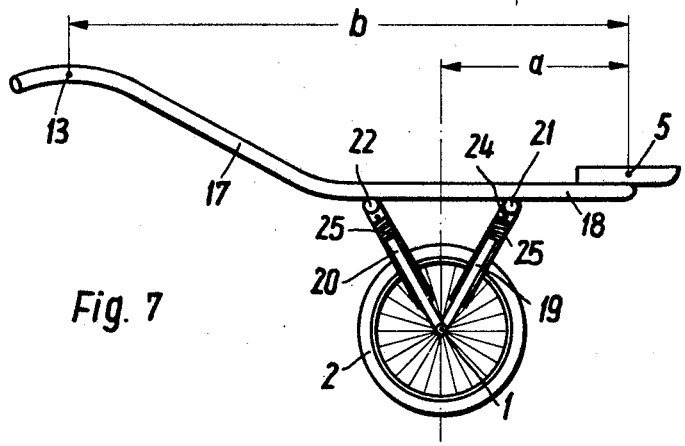
Figure 8:
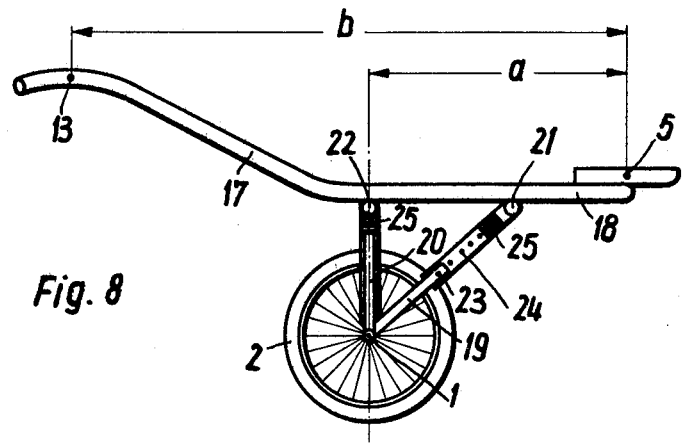

Particular and preferred embodiments of the invention are hereinafter described and illustrated in the accompanying drawings, of which FIGURE 1 is a side elevation of a sulky according to the invention, and FIGURE 2 a plan view thereof, FIGURES 3, 4 and 5 are details of the arrangement for mounting the wheel axles of the sulky, shown partly in section, FIGURES 6, 7 and 8 are side elevations of another sulky according to the invention, showing in each drawing a different position of adjustment of the struts, FIGURE 9 is a plan view of the sulky illustrated in FIGURES 6 to 8, and FIGURES 10, 11, 12, 13 and 14 show modifications of the sulky illustrated in FIGURES 6 to 9.

Referring to FIGURES 1 to 5 of the said drawings, bearings 1 of the axles 15 of the wheels 2 and of their bushes 16 are formed by lugs 14 at the ends of the relatively deflectable pair of struts 3, 3 and strut 4. The pair of struts 3, 3 form the shafts of the sulky and the strut 4 forms a closed rearward arch which carries the driver's seat 5. The seat may be adjustable to a rear position as indicated in chain outline. The front ends of the shafts 3, 3, as indicated by chain lines, may be cross-connected by an arch 6′ either across the breast of the horse or (6″) over the back of the horse, which arrangements make for stability of construction and ensures that the wheel track cannot vary.

The pair of struts 3, 3 and strut 4 are held at the desired angle to each other by resilient bracings for instance in the form of tensioned wires 7, 7. Each tension wire includes a spring 8, which imparts resilience to the carriage frame and during the race prevents jolts from being transmitted to the horse's body, such as would otherwise be transmitted through the traces to the horse's breast. For maintaining the correct wheel track it is important that the bracing wires 7, 7 each pass through an imaginary point 9 located vertically above the centres of the axles of the wheels 2. By changing the points of attachment 10 and 11 of each tension wire, for instance by relocating clamping straps, the relative angle made by the struts 3 and 4, and hence the horizontal distance $a$ between the vertical 12 and the driver's seat 5, are adjustable. These distances can also be varied by providing struts 3 and 4 of adjustable length, for instance by employing telescopic struts. It has been found particularly useful to adjust the distance $a$ to between $1/7$ and $5/7$ of the distance $b$ between the driver's seat and the point of attachment of the harness.

FIGURE 3 illustrates a strut 3 separated from the strut 4, and the corresponding axle bearings 1 when separated. The strut 3 is provided with an arcuate lateral member 3' and the strut 4 has a similar member 4' attached thereto, for instance by welding. The ends of the struts 3 and 4 as well as of the members 3' and 4' are formed with lugs 14 through which the axle 15 is insertable and which can be secured on each side by a threaded bush 16 and threads on the axle 15. FIGURE 4 shows the screw mounting on one side. It will be understood from FIGURE 5 that the slotted lugs at the ends of the struts 3 and 4 together embrace the axle 15.

It will also be appreciated from the said drawings that the sulky can be assembled and dismantled merely by carrying out a few simple manipulations. The components can then be closely packed to occupy little space during transportation and storage.

FIGURES 6 to 9 show a further embodiment comprising shafts 17 integral with a rear arch 18, the frame being made rigid by bracing stays 18'. The driver's seat 5 mounted on the arch and may be adjustable.

The axle bearings 1 for the wheels 2 are supported by two pairs of struts each pair shown at 19, 20, which are pivotably attached at 21 and 22 respectively to the shafts 17 and frame 18. The bottom ends of the said struts are bifurcated to form forks, and the two forks each cooperate to embrace the bearing or axle. The length of the struts 19 and 20 is telescopically adjustable, the two telescoped tubular members being fixed in desired position by a cotter pin 23 insertable into an appropriate hole 24 in each of the struts. Springs 25 are provided which may be used for a spring elastic suspension, or which may be inactivated. In FIGURE 6 the strut 19 is resilient, whereas the strut 20 is rigid. In FIGURE 7 both struts are resilient and in FIGURE 8 only the strut 20 is resilient.

By adjusting the length of the struts 19 and 20 and hence their relative angular position in the manner illustrated in FIGURES 6, 7 and 8, the ratio of the lengths $a$ to $b$ is selectably variable according to the driver's weight and the degree of relief that is to be afforded the horse in the shaft.

Since the wheels 2 can be dismantled and the struts 19 and 20 placed flat against the frame of the carriage this latter embodiment of a sulky according to the invention can likewise be stored and transported in a packed condition taking up minimum space. Generally speaking this latter embodiment combines the conventional construction of sulkies with the advantages afforded by the invention.

The further embodiments of sulkies according to the invention illustrated in FIGURES 10 to 14 are modifications of the embodiment according to FIGURES 6 to 9.

Figure 11:
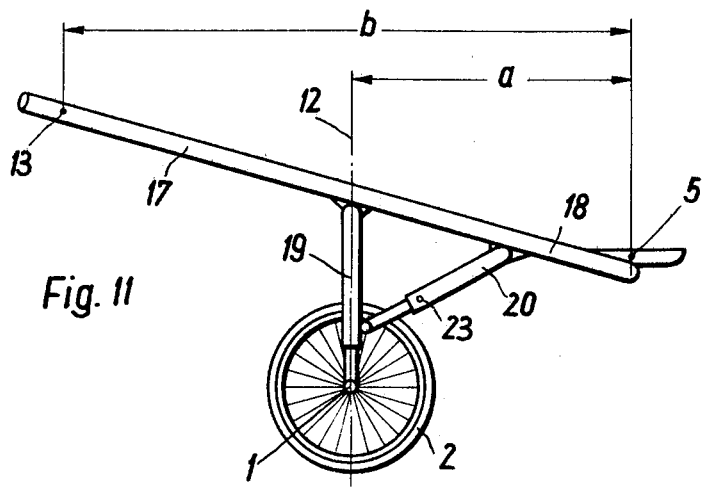
Figure 10:
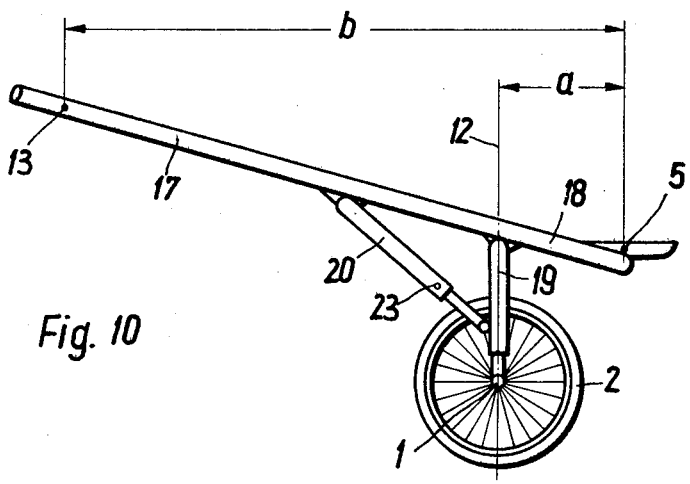

In the embodiments shown in FIGURES 10 and 11, two pairs of struts are provided, of each pair only one strut 19 directly carries the wheel axle bearing 1, the other strut 20 of each pair being pivotably linked to the strut 19 and to the shaft.

Figure 13:
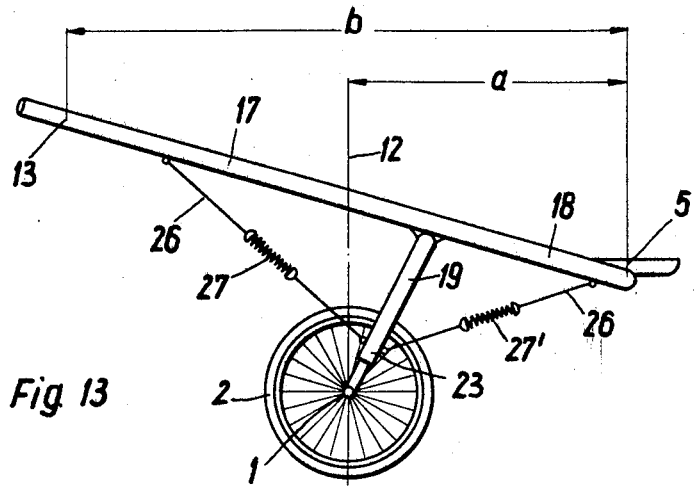
Figure 12:
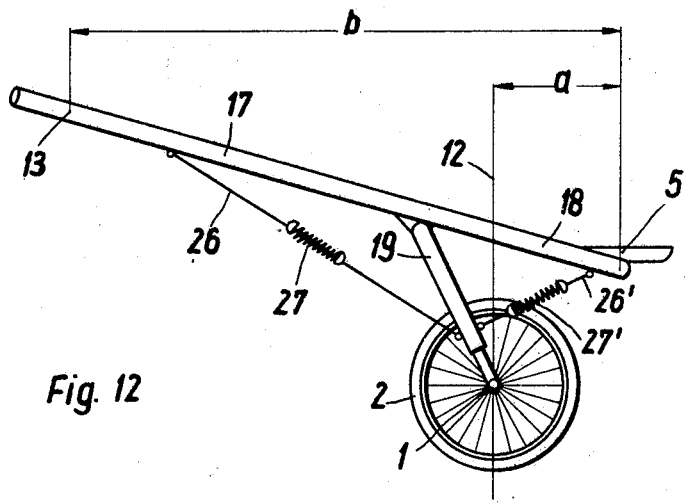

In the embodiments shown in FIGURES 12 and 13, only one pair of struts 19 is provided, the other pair of struts being replaced by two pairs of tensioned bracing wires, one pair being shown each at 26 and 26', which contain springs 27 and 27'. The bracing wires together keep the strut in the desired position.

In the two embodiments according to each of FIGURES 10/11 and FIGURES 12/13 the pair of shafts 17 and the rear arch 18 have an elongated configuration.

Figure 14:
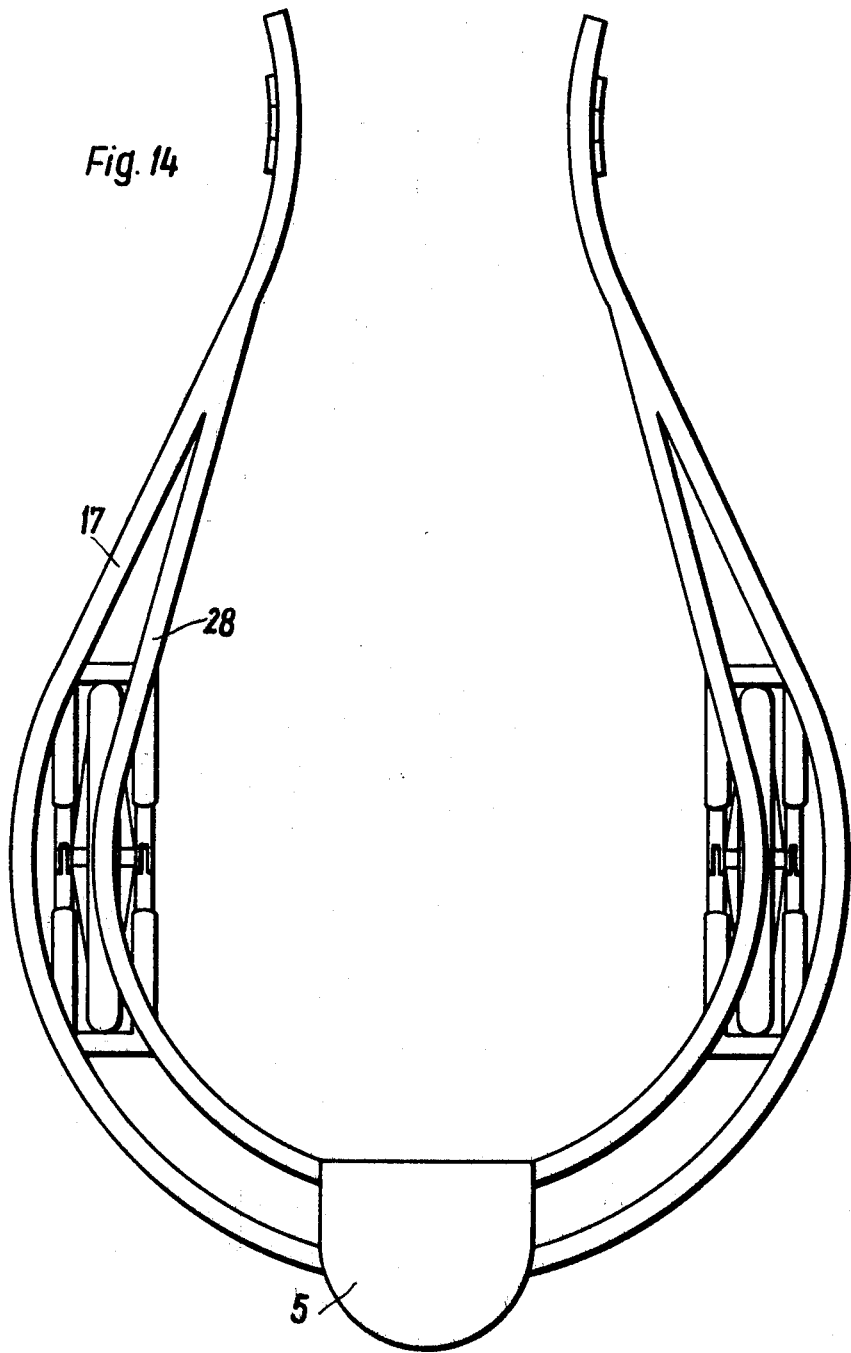

In the embodiments illustrated in FIGURES 6 to 9 the stays 18' (FIGURE 9) may be replaced by a reinforcing member 28' extending around the entire rearwardly arched portion of the shafts, as shown in FIGURE 14.

What is claimed is:

1. A sulky comprising:
   a frame having a pair of drawing shafts, and a rearwardly arched member integral therewith, said member carrying a driver's seat situated to the rear of a vertical plane through the wheel axles of said sulky,
   each of said wheel axles being interconnected with the frame by struts which are each pivotally mounted at a first end on the frame and pivotally mounted to each other, and each of said wheel axles having at least one of said struts pivotally connected at a second end thereto, and
   said struts being adjustable in length whereby the horizontal distance between said vertical plane and said driver's seat is adjustable.

2. The sulky of claim 1 wherein for each of said axles each of said struts are pivotally connected at a second end to said axle.

3. The sulky of claim 2 wherein said struts are telescopic.

4. The sulky of claim 2 wherein at least one of said struts is a resilient strut.

5. The sulky of claim 1 wherein for each of said axles one of said struts is pivotally mounted on another of said struts.

6. The sulky of claim 5 wherein said struts are telescopic.

7. The sulky of claim 5 wherein at least one of said struts is a resilient strut.

References Cited

UNITED STATES PATENTS

| 507,839 | 10/1893 | Payne | 280—63 |
| 518,462 | 4/1894 | Loomis | 280—63 |
| 2,365,884 | 12/1944 | Kucera | 280—63 |
| 2,393,642 | 1/1946 | Kowalski | 280—43.2 |

LEO FRIAGLIA, Primary Examiner

ROBERT R. SONG, Assistant Examiner